Nov. 24, 1964  C. HUFF  3,158,445
APPARATUS FOR DETERMINING PROTHROMBIN TIME
Filed July 6, 1960

INVENTOR.
CARL HUFF
BY Flehr and Swain
ATTORNEYS

United States Patent Office 3,158,445
Patented Nov. 24, 1964

3,158,445
APPARATUS FOR DETERMINING
PROTHROMBIN TIME
Carl Huff, Los Altos, Calif., assignor to Oxford Laboratories, Redwood City, Calif., a corporation of California
Filed July 6, 1960, Ser. No. 41,169
2 Claims. (Cl. 23—253)

This invention relates generally to a method and apparatus for determining the prothrombin time of whole blood and more particularly to a method and apparatus in which the determination may be made on relatively small samples of whole blood such as may be obtained by lancing a finger tip or ear lobe.

In many instances the determination of prothrombin time of blood becomes a matter of life or death. Several methods exist for determining this time. One method requires hospitalizing the patient and obtaining a blood sample intravenously. The blood is then treated to remove the calcium, placed in a centrifuge to obtain the plasma, and the plasma is reacted with a reagent in a test tube to determine the prothrombin time. The test is time consuming; consequently the results are not immediately available.

To overcome these difficulties, a method commonly referred to as the "Manchester Method" has been developed. The Manchester Method is described in Manchester, B., "The Prevention of Myocardial Infarction," A.M.A. Arch. Int. Med. 100, 959–964, December 1957, and Manchester, B., and Rabkin, B., "The Control of Dicumarol Therapy in Myocardial Infarction by Simple Blood Prothrombin Test." Circulation 10, 691 (1954). In this method, relatively small amounts of blood such as can be obtained by lancing a finger tip or ear lobe are sufficient. The method can be performed in a doctor's office, at bedside or in conventional hospital procedures. The accuracy and consistency of the results under this method are dependent upon, among other things, maintaining the temperature of the reacting substances and the equipment used at normal body temperature. Variations of these temperatures cause serious errors in the evaluation of the prothrombin time. Accuracy of the time read is highly important. The time which elapses during a test must be accurately determined.

In the copending application of Charles R. Kuzell, Serial No. 734,576, now Patent No. 3,041,146, an apparatus is described for determination of prothrombin time. The apparatus described includes an electrically heated block of aluminum, the top surface of which includes a number of spherical dimples. The block is further characterized by a plurality of horizontal wells therethrough for holding and heating pipettes. A thermometer may be retained in one of these wells for determining the actual temperature of the block. In the operation of the apparatus described in the aforementioned application, a measured amount of blood and reagent are deposited in one of the heated dimples and are mixed therein. Simultaneously a timer is started and upon notice by the technician that the blood coagulates the timer is stopped. The timer may then be read to give an accurate determination of the prothrombin time.

It is a general object of the present invention to provide an improved method of carrying out the above test.

It is another object of this invention to provide apparatus capable of performing the improved method.

It is a more particular object of the present invention to provide a method and apparatus of the above character in which blood coagulation is more easily determined.

It is still another object of the present invention to provide a method and apparatus of the above character wherein the determination of blood coagulation is automatic.

These and other objects of the present invention will become more clearly apparent from the following description when taken in conjunction with the accompanying drawing, in which.

Figure 1:
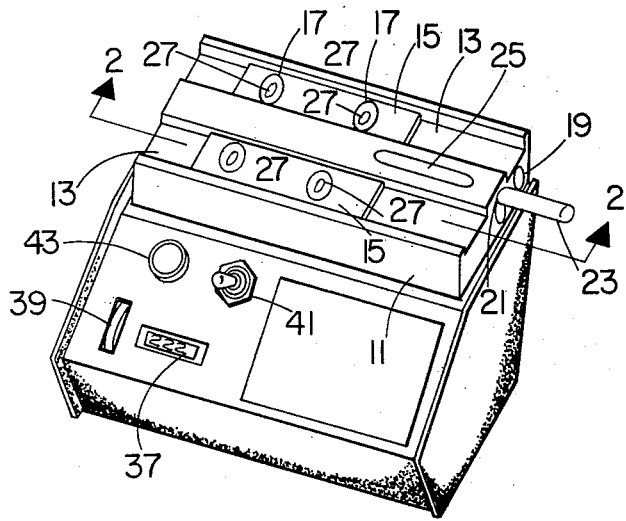
FIGURE 1 is a perspective view showing an apparatus in accordance with one embodiment of the invention.

The apparatus shown includes a relatively large block of metal 11 which not only forms a working surface for the test but includes provisions for retaining and heating the materials used in the test. The metal used in the block preferably has a relatively high heat conductivity and specific heat. It has been found that aluminum and especially anodized aluminum is suitable for these purposes. Longitudinal recesses 13 are employed at the top of the block 11 and serve to receive slides 15. The slides are in intimate contact with the block to provide efficient heat transfer.

Each of the slides 15, include one or more dimples or concavities 17, preferably of spherical shape. These dimples are smooth and polished to give a suitable surface for carrying out the reaction to determine prothrombin time. The material used for the slides 15 should be transparent and have as high a heat conductance as possible. Glass forms a suitable surface.

The block further includes a plurality of horizontal wells 19 which serve to carry and heat a number of pipettes. An additional well 21 is included and serves to retain a thermometer 23 for accurate determination of the block temperature. A transparent window 25 may be included in the block whereby the thermometer may be read without withdrawal.

Figure 2:
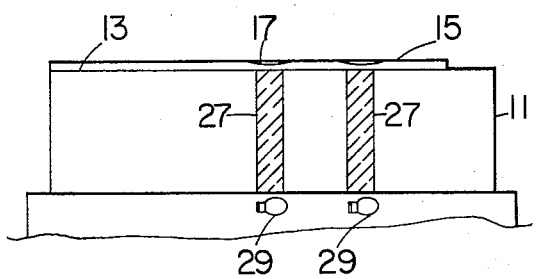
FIGURE 2 is a partial sectional view along the line 2—2 of FIGURE 1.

As seen in FIGURE 1 and more particularly in FIGURE 2, means for transmitting light in the form of one or more translucent rods 27 are located in the block 11 and extend therethrough from the upper to the lower surfaces. Mere apertures in the block may be used as an alternative to the rod. The rods 27 are located in the block 11 such that their upper extremity lies approximately along the longitudinal axis of the recesses 13. A light bulb 29 is disposed adjacent the lower end of each of the rods 27.

Figure 3:
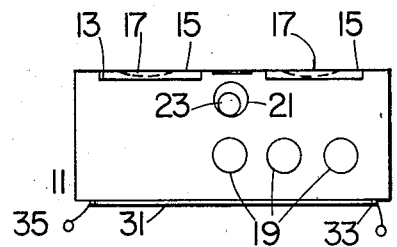
FIGURE 3 is a partial side elevational view of the apparatus shown in FIGURE 1.

Although the block 11 may be heated in a conventional manner, heating is preferably accomplished by the use of a resistive contact film about the block itself. Such a film is shown in FIGURE 3 at 31. The film may be secured in intimate contact with the block 11 and include end contact terminals 33 and 35. The contact terminals 33 and 35 may be connected to a source of electrical energy.

If the resistive material used is transparent, it may cover the entire upper surface of the block 11. However, if the material is opaque, an opening should be provided above each of the rods 27.

As seen from FIGURE 1, the apparatus further includes a heater switch 41 and a heater pilot light 43. The heater preferably is thermostatically controlled and the pilot light 43 may be connected such that it is lighted only when power is applied to the heater. The thermostat may be any suitable device which serves to open a switch when the temperature of the block 11 reaches a predetermined value.

Inasmuch as the reaction must be timed within fractions of the second, it is desirable that a timer be provided. Such a timer may include a synchronous motor which drives the mechanical counter 37. Thus, by energizing the motor which runs at a synchronous frequency, the counter will act as a timer indicating elapsed time. The motor operation may be started by a switch 39, which switch may also be used to reset the timer.

Operation of the device to bring the block up to temperature and to control the same would be to place the switch 41 such as to connect the power source to the heating element 31. At this time the pilot light may be turned on. When the pilot light 43 is extinguished it is apparent that the thermostat temperature has been reached. The thermometer 23 may be read as a more accurate check of the block temperature than the earlier described thermostat. The apparatus is then ready for carrying out the determination.

The prothrombin time determination is carried out substantially as follows: The slides 15 are disposed within the recesses 13 such that the dimples 17 are in registry with the rods 27. A measured amount of reagent (which may be a compound of Bacto-Thromboplastin) is placed within one or more of the dimples 17. Other suitable reagents are well known in the art and the amount of any particular reagent is dependent upon its type. A pipette which has previously been heated within one of the wells 19 in the apparatus may be withdrawn and utilized to draw a sample of blood. A measured amount of the blood is then added to the reagent for carrying out determination. Simultaneously with the addition of blood, the timer is started by the switch 39, and the light 29 may be illuminated. The blood and the reagent are agitated within the recess 17. Before the coagulation of blood, light from the bulb 29 through the rod 27 may be seen through the transparent slide 15 and the translucent deposit of blood and reagent. However, upon coagulation, the blood forms a relatively oqapue mass thereby reducing the amount of light transferred therethrough. Thus the change of light transmission from the rod 27 through the blood in the reagent serves as an indication of blood coagulation. At this point the timer is stopped and read to give an indication of the elapsed time.

Figure 4:
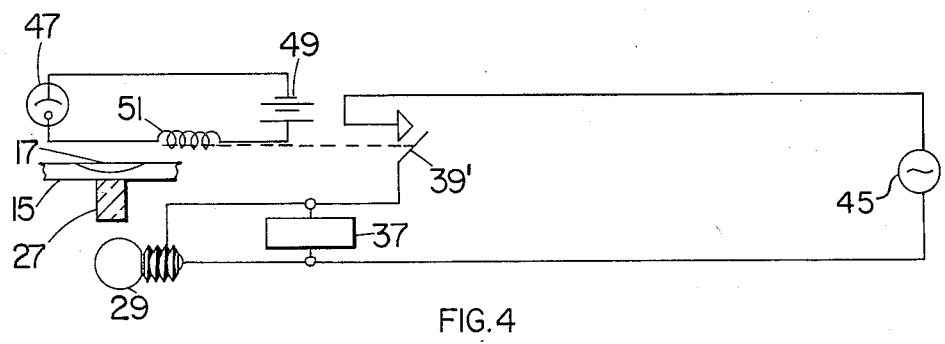
FIGURE 4 is a schematic block diagram of another embodiment of the invention wherein the timing is automatic.

It is apparent that automatic means may be provided for stopping the timer upon coagulation of the blood. Such automatic operation may be provided with the same apparatus previously described with the addition of several electrical elements. As shown schematically in FIGURE 4, the light 29 may be in circuit with the counter 37 and a source of power 45. Power may be supplied to the light and the counter by manual operation of the switch 39'.

A photoelectric cell 47 is disposed above the rod 27 whereby light may impinge thereon. The photoelectric cell is in circuit with its source of operating potential 49 and relay coil 51. The relay coil 51 operates in conjunction with the switch 39' and serves to maintain the switch closed when a predetermined current passes through the coil.

Thus, when relatively translucent blood and reagent is placed in the dimple 17 and the switch 39' is manually and momentarily closed, current flows in the photoelectric circuit to maintain the switch closed. The counter 37 starts operation upon manual closure of the switch 39'. As the blood and reagent is agitated in the dimple, it becomes coagulated and relatively opaque. Less light is transmitted to the photocell 47 and the coil 51 current is reduced. The reduction in coil current causes the switch 39' to open and to stop the counter 37.

I claim:

1. A prothrombin time determining apparatus comprising a block of metal having upper and lower surfaces, means for transmitting light between said upper and lower surfaces, said means for transmitting light including a translucent rod, a transparent slide disposed on the upper surface of said block of metal, the transparent slide including at least one concave dimple on the upper surface thereof for receiving blood and reagent, said dimple being disposed above said means for transmitting light, and a source of light disposed adjacent said means at the lower surface of said block of metal whereby a change of light transmissivity may be detected when said blood and reagent coagulate.

2. A prothrombin time determining apparatus comprising a block of metal having upper and lower surfaces, means for transmitting light between said upper and lower surfaces, a transparent slide disposed on the upper surface of said block of metal, the transparent slide including at least one concave dimple on the upper surface thereof for receiving blood and reagent, said dimple being disposed above said means of transmitting light, a source of light disposed adjacent said means at the lower surface of said block of metal whereby a change of light transmissivity may be detected when said blood and reagent coagulate, means for heating said block of metal, means responsive to the temperature of the metal block for controlling the heat means whereby the temperature of said block remains substantially constant at a temperature near body temperature, a timer and light sensitive means for controlling the operation of said timer, said slide being disposed between said light sensitive means and said means for transmitting light whereby the timer is operated responsive to a predetermined transmissivity of light.

References Cited in the file of this patent

UNITED STATES PATENTS

| | | |
|---|---|---|
| 2,041,290 | Jackson | May 19, 1936 |
| 2,276,021 | Copley | Mar. 10, 1942 |
| 2,333,791 | Hutchison | Nov. 9, 1943 |
| 2,417,802 | Longstreet | Mar. 18, 1947 |
| 2,878,715 | Rhees | Mar. 24, 1959 |
| 3,041,146 | Kuzell | June 26, 1962 |

OTHER REFERENCES

Noller: Anal. Chem., vol. 14, #10 (1942), page 834.